United States Patent [19] [11] 4,194,473
Hidaki [45] Mar. 25, 1980

[54] FOUR-CYCLE SPARK IGNITION INTERNAL COMBUSTION ENGINE

[76] Inventor: Ichiro Hidaki, 473-1, Yoshiocho, Miyakonojo-shi, Miyazaki, Japan

[21] Appl. No.: 898,128

[22] Filed: Apr. 20, 1978

[30] Foreign Application Priority Data

Apr. 23, 1977 [JP] Japan ................................. 52/47690

[51] Int. Cl.² ............................................. F07M 25/06
[52] U.S. Cl. ................................. 123/119 A; 123/26; 123/64; 123/76
[58] Field of Search ................... 123/26, 76, 64, 119 A

[56] References Cited

U.S. PATENT DOCUMENTS

| 871,632 | 11/1907 | Rollason | 123/64 |
| 1,082,932 | 12/1913 | Collins et al. | 123/64 |
| 1,825,959 | 10/1931 | Kondo | 123/64 |
| 2,360,600 | 10/1944 | Urana | 123/76 |
| 2,415,509 | 2/1947 | Mallory | 123/76 X |
| 2,798,467 | 7/1957 | Davids | 123/76 |
| 3,046,961 | 7/1962 | Dolza | 123/76 |
| 3,182,645 | 11/1965 | Wilson | 123/26 |
| 3,537,257 | 11/1970 | Webster et al. | 123/26 |

Primary Examiner—Wendell E. Burns
Attorney, Agent, or Firm—Blanchard, Flynn, Thiel, Boutell, & Tanis

[57] ABSTRACT

In a four-cycle spark-ignition internal combustion engine, knocking under a high compression ratio can be prevented by replacing the burnt gas which remains within the cylinder at the end of an exhaust stroke by a gas, such as exhaust gas, which is at a temperature approximating normal temperature, and that the ignition timing is controlled so as not to precede the knocking limit ignition point.

5 Claims, 1 Drawing Figure

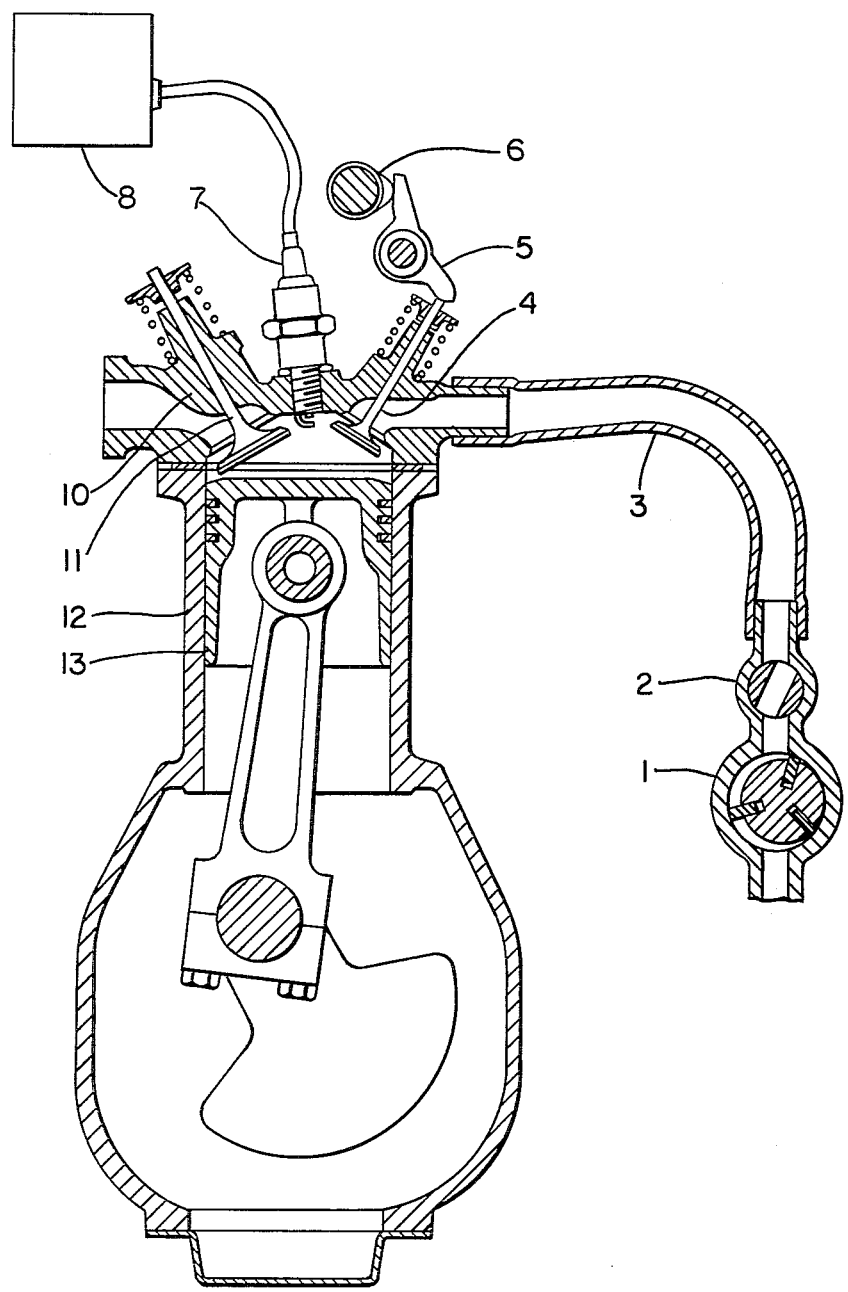

FOUR-CYCLE SPARK IGNITION INTERNAL COMBUSTION ENGINE

BACKGROUND OF THE INVENTION

1. Field of the Invention

This invention relates to a four-cycle spark-ignition internal combustion engine characterized by combining both (1) a measure in which the burnt gas remaining in the cylinder at the end of the exhaust stroke is replaced by a gas, such as exhaust gas, which is at a temperature approximating normal temperature and, (2) a measure in which, when a "knocking limit ignition point" exists, the ignition timing of the engine is controlled so as not to precede the "knocking limit ignition point," thereby to prevent the occurrence of knocking and to make it possible to use a high compression ratio. The expression "knocking limit ignition point" shall signify the ignition point up to which the ignition timing can be advanced without incurring knocking.

2. Description of Prior Art

Regarding a four-cycle spark-ignition internal combustion engine which operates on the Otto cycle (hereinbelow, termed the "engine"), it is well known that the thermal efficiency of the operation is higher as the compression ratio is higher. An engine of high compression ratio, however, is liable to exhibit knocking at a high engine output. Knocking is destructive to the engine and is dangerous, and hence, unless the occurrence of knocking is preventable, the compression ratio cannot be raised more.

In the case of operating an engine of a certain compression ratio under certain fixed circumstances, when the ignition timing is delayed, the tendency toward knocking is reduced but the thermal efficiency also is reduced. In the engines according to the conventional techniques, when the compression ratio is made high and the increased tendency toward knocking thus incurred is intended to be prevented by delaying the ignition timing, the lowering of the thermal efficiency attributed to the delay of the ignition timing is great and is more than the increased thermal efficiency based on the increase of the compression ratio, so that the overall thermal efficiency of the engine is reduced. For this reason and because the control of the ignition timing becomes delicate, it has scarcely been put into practical use to adopt a higher compression ratio by retarding the ignition timing.

SUMMARY OF THE INVENTION

According to this invention, in order to adopt a higher compression ratio, the ignition timing is adequately delayed. Simultaneously therewith, the burnt gas remaining within the cylinder at the termination of an exhaust stroke is replaced with an exhaust gas at a temperature on the order of normal temperature or any other suitable gas (hereinbelow, the replacement gas shall be called the "scavenging gas"), and the occurrence of knocking is prevented also by this measure. When the two measures are used in combination, the extent of the delay of the ignition timing as required due to the raised compression ratio becomes low, and there is achieved an effect based on the high compression ratio, so that a lowering of the thermal efficiency scarcely takes place.

It is an object of this invention to provide an engine of high compression ratio which has means for preventing knocking without lowering the thermal efficiency.

The engine of this invention is constructed by adding to an engine which does not have a scavenging function (hereinafter, termed the "conventional engine"), the following four specific characteristics or functions:

(a) The compression ratio is made considerably higher than in the conventional engine.

(b) The gas which remains within the cylinder at the end of the exhaust stroke (hereinafter, called "the residual gas") is scavenged with a gas which is at a temperature approximately normal temperature.

(c) The ignition timing is set so as not to precede the most advanced ignition point in the range in which knocking does not take place (hereinbelow, termed "the knocking limit ignition point").

(d) The extent of the scavening and the ignition timing are controlled in association with each other by a method which prevents knocking according to the tendency toward the occurence of the knocking which varies in dependence on the running state of the engine and which renders the thermal efficiency as high as possible.

First, Item (a) will be explained.

When, in the conventional engine, there are used the measure of carrying out the scavenging and the measure of setting the ignition timing so as not to get ahead of the knocking limit ignition point (hereinafter, called "the use of the delayed ignition"), a high power running such as throttle valve full-admission operation can be done without incurring knocking even if a high compression ratio, which has not been available in the conventional engine, is employed. Experiments have revealed that an engine of a compression ratio of 12.5, on which this invention has been performed, can run at a high thermal efficiency under the throttle valve full-admission condition without incurring knocking. The engines of this invention employs a proper compression ratio in a range of compression ratios which can be employed by using the scavenging and by using the delayed ignition. In order to satisfactorily attain the beneficial result of this invention, there is employed a compression ratio which is considerably higher than compression ratios which are used in the conventional engine. According to this invention, it is preferred that the compression ratio is in the range between 10 and 15.

Now, Item (b) will be explained.

In order to execute the scavenging, a structure as described below is used.

A gas passage which communicates with the combustion chamber is installed. One end of the passage is coupled with a pump for feeding the scavenging gas into the combustion chamber, while the other end of the passage is open to the combustion chamber. A valve for controlling the scavenging (hereinafter, termed the "scavenging valve") is disposed in the vicinity of the opening part of the passage, and a valve operating mechanism for moving this valve is installed. The suction passage and the exhaust passage are constructed similarily to those of the conventional engine.

With such a structure, the engine of this invention carries out an exhaust action as described below. At an appropriate timing at which the exhaust stroke has come close to its end, the scavenging valve is opened. The scavenging gas is continuously fed to the scavenging valve by the pump, and is pressurized so that the scavenging flow rate may become a proper quantity.

When the scavenging valve is opened by the valve operator, the scavenging gas flows into the cylinder. Since the exhaust valve is open at this time, the burnt gas flows out through the exhaust passage due to the inflow and sweep of the scavenging gas. The scavenging valve is closed at nearly the same timing as that of the closure of the exhaust valve, and hence, the scavenging action is continued until the time at which both of the valves are closed.

Accordingly, the time at which the scavenging is carried out is the time when the piston lies near its top dead center position in the cylinder and when the volume between the piston and the cylinder head is smallest. With a comparatively small amount of scavenging gas, therefore, there is readily achieved such an extent of scavenging that most of the components of the residual gas are replaced by the scavenging gas.

In order to adjust the extent of the scavenging, valve means capable of regulating the rate of delivery is added to the scavenging pump in advance, or the valve timing of the scavenging valve is made variable in advance, whereby the extent of the scavenging can be varied according to the control of the control device, depending on the running state of the engine.

When the scavenging is executed, most of the residual gas at a very high temperature is replaced with the scavenging gas at the low temperature, so that the gas remaining in the cylinder has a relatively low temperature. The exhaust stroke is followed by a suction stroke, and the gas remaining in the cylinder and the suction gas mix to form a gas within the cylinder at the termination of the suction stroke. Therefore, the temperature of the intra-cylinder gas is considerably lower than in the case when no scavenging is effected.

Now, Item (c) will be described.

In the case of operating an engine of high compression ratio at a high output, when the ignition timing is gradually advanced from a later ignition point, knocking begins at a certain ignition point. An ignition point immediately before such a certain ignition point is the "knocking limit ignition point" in that particular operation. In this invention, the ignition timing is controlled at all times so as not to precede the knocking limit ignition point.

Now, Item (d) will be described.

In the engine of this invention, the extent of the scavenging and the ignition timing must be controlled in association with each other. Hereunder, the way of achieving this association will be explained.

Since knocking is the most liable to occur in the operation at high power, it is prevented by combining the scavenging and the use of the delayed ignition. As the power lowers is reduced, the tendency toward the occurrence of the knocking decreases. Therefore, the ignition timing is firstly advanced in the range in which knocking does not take place. The ignition timing is advanced more and more with the lowering of the engine power, and at last, it reaches the maximum torque ignition timing at a certain output. In the case where an operating state which is further less prone to knocking has been thereafter established, the extent of the scavenging is reduced to that extent.

At the high compression ratio, the highest explosion pressure of the intra-cylinder gas becomes considerably great. This pressure can be limited to below a certain suitable value by delaying the ignition timing. In the case of the engine of this invention, therefore, the limitation of the highest explosion pressure can be easily accomplished by adding this consideration to the function of controlling the ignition timing. In this case, or in order to achieve the goal of recirculating the exhaust gas, the scavenging and the delay of the ignition timing are sometimes exploited even when there is no fear of knocking.

The ignition timing and the extent of the scavenging need to be controlled cooperatively as thus far described, in accordance with various operating states. Although the ignition timing must be made in angle which is as close to the knocking limit ignition point as possible, it must not precede the knocking limit ignition point. A control of high precision is required, and to this end, it is necessary to dispose a control device which quickly senses the various factors in the operation of the engine that affect the occurrence of knocking, which control calculates from those factors the extent of the scavenging and the ignition timing needed for preventing the occurrence of knocking, and which makes the control as calculated. Such a control device can be satisfactorily realized by the use of the present-day techniques.

Although, in the above, the measures (a) to (d) have been individually explained, they bring forth the beneficial result of this invention when performed at the same time.

BRIEF DESCRIPTION OF THE DRAWING

The drawing is a vertical sectional view showing a concrete embodiment of this invention.

DESCRIPTION OF THE PREFERRED EMBODIMENT

The drawing illustrates an embodiment in which this invention is applied to a conventional engine of the reciprocating piston type. Although a cylinder head 10 is provided with a suction port as well as a suction valve and an exhaust port as well as an exhaust valve, only the exhaust port as well as the exhaust valve 11 are shown in the FIGURE. The scavenging system comprises a scavenging pump 1, a scavenging gas feed pipe 3, a scavenging valve 4, a rocker arm 5 for operating the scavenging valve, and a cam 6 for operating the rocker arm. During the running of the engine, the scavenging pump 1 is operated, and a scavenging gas is fed into the scavenging feed pipe 3 under a suitable pressure. In the exhaust stroke, the piston 13 ascends, and the exhaust valve is open as shown in the FIGURE, so that burnt gases are exhausted. At a time when, in the exhaust stroke, the piston has ascended to an appropriate extent, the scavenging valve is opened under the action of the cam 6 for the scavenging valve. The scavenging gas flows into the cylinder owing to its own pressure, and the burnt gas remaining within the cylinder is driven out through the exhaust port, whereby a scavenging action is performed. The scavenging action continues during the period during which the scavenging valve and the exhaust valve are open. In this respect, inasmuch as both the valves are built so as to be shut at a time when the piston has somewhat moved beyond its top dead center position, the scavenging action is performed and then terminated at the time when the piston lies near the top dead center position and when the volume within the cylinder is the smallest. Accordingly, a satisfactory scavenging can be executed with a comparatively small quantity of scavenging gas.

The scavenging system has a scavenging gas regulator valve 2, which is used for regulating the quantity of the scavenging gas. A spark plug 7 is caused to spark at the ignition timing previously described by means of an ignition power supply device 8 including an ignition timing controller, and thereby ignites the fuel gas mixture.

The cylinder head 10 is fabricated so as to establish the high compression ratio in the already-described degree in association with the top dead center position of the piston.

It has not been put into practical use up to now that the occurrence of knocking is prevented by delaying the ignition timing, thereby intending to raise the compression ratio. The main cause for this situation seems to lie in that the increase of the thermal efficiency owing to the enhancement of the compression ratio in a considerable amount is smaller than the decrease of the thermal efficiency due to the use of the delayed ignition, with the result being that the thermal efficiency of the engine lowers appreciably as a whole.

In the engine of this invention, owing to the execution of the scavenging, the temperature of the gas within the cylinder at the termination of suction becomes considerably lower than in the conventional engine. Accordingly, the compression temperature becomes considerably lower, and the extent of tendency toward knocking lessens. Thus, the necessary amount of the delay of the ignition timing as attributed to the enhancement of the compression ratio is reduced, and the thermal efficiency of the engine is, at least, prevented from being lowered.

According to the teaching of thermodynamics, the temperature (hereinbelow, termed the "compression temperature") and pressure ("compression pressure") of the intra-cylinder gas at the termination of the compression stroke are determined by the mass of the gas within the cylinder, the compression ratio, and the temperature of the gas at the beginning of compression, and under equal gaseous masses and compression ratios, both the compression temperature and the compression pressure are lower as the temperature at the beginning of compression is lower. Since equal masses of the gas within the cylinder mean substantially equal outputs, the above fact signifies that even when the outputs are equal and also the compression ratios are equal, both the compression temperature and the compression pressure become lower when the scavenging is executed than when it is not. In an example of calculation which has been done under the same conditions as mentioned above and under assumptions close to actual conditions in relation to the throttle valve full-admission operation, in the case where the compression ratio is 12.5, the compression temperature is reduced by 33 degrees (degrees in Celsius, and the same applies hereinbelow) and the compression pressure is reduced by 1.2 atmospheres when the scavenging is carried out, with respect to corresponding values when scavenging is not carried out.

In general, the mixture in which gaseous or vaporous fuel and air are mixed is more liable to undergo a spontaneous oxidizing reaction as the temperature and/or the pressure become(s) higher. The initial stage of the reaction is the so-called precombustion reaction which is not the real combustion. It is thought, however, that as the extent of the precombustion reaction increases, the mixture will change to be higher in the danger that knocking will occur. In the present-day high-performance engines in which the compression ratio is raised to the limitation of the occurrence of the knocking, the compression temperature and the compression pressure in a high power operation are high enough to give rise to the precombustion reaction, and hence, the lowering of the compression temperature and the compression pressure to the extents described in the foregoing example of calculation can be conjectured to be considerably effective for preventing knocking. In this respect, actual effects have been experimentally verified as described below.

A one-cylinder engine having a displacement of 331 cc was operated at a rotational frequency of 1,600 rpm, with a throttle valve opened fully, and at an air fuel ratio of about 16, and while varying the compression ratio. In case where the compression ratio was 10.3 and where the scavenging was not carried out, the igniton timing was 20 degrees before the top dead center, the output was 4.8 hp and the thermal efficiency was 27.1%. In both this case and the cases to be described below, the ignition timing was made about 3 degrees to 4 degrees later than the knocking limit ignition point.

In the case where the engine was operated under the same running conditions, by raising the compression ratio to 12.5 and without performing the scavenging, the ignition timing was 4 degrees before the top dead center, the output was 4.7 hp and the thermal efficiency was 26.2%. It is understood from this fact that the delay of the ignition timing necessary for preventing the knocking is great and that the thermal efficiency lowers. In the case where, under the same running conditions and at the same compression ratio, the scavenging was carried out by feeding an exhaust gas at normal temperature in an amount equivalent to 30% of the stroke volume, the ignition timing became 12 degrees before the top dead center, the output was 4.7 hp and the thermal efficiency was 28.3%. In this case, the necessary delay of the ignition timing is less than in the case of the absence of the scavenging, which proves the effect of the scavenging for preventing the knocking. In addition, at the same compression ratio, the thermal efficiency is better than in the case of the absence of the scavenging. In the point of the thermal efficiency, the result in this case is not inferior even when compared with the result in the case of the compression ratio of 10.3.

The advantage of the engine of this invention is demonstrated in an operating range in which the knocking is less feared. Medium- and low-output operations belong to such a range. In the range, the ignition timing can be advanced to the maximum torque ignition point or the vicinity thereof, and the high thermal efficiency of the engine of high compression ratio can be enjoyed as it is.

In an experiment in which the experimental engine referred to above was operated at a rotational frequency of 1,600 rpm and with commercially-available leaded gasoline, the following results were obtained. Even when the compression ratio was as high as 12.5 and the ignition timing was advanced to the maximum torque ignition point without the scavenging, the knocking did not occur at a power coefficient of 2/4. In the case where the engine was operated at the power coefficient of 2/4, the maximum torque ignition point and the maximum thermal efficiency air-fuel-ratio and without the scavenging, the thermal efficiency was 22.3% at a compression ratio of 10.3 and was 25.1% at a compression ratio of 12.5. This proves that, in the absence of the fear of the knocking, a higher compression ratio brings forth an operation of appreciably higher thermal efficiency.

In uses wherein engines are operated in medium- and low-power ranges more frequently as in case of automobile engines, the engine of this invention which is substantially equivalent in a high-power range and considerably superior in the medium- and low-power ranges in comparison with the conventional engine in point of the thermal efficiency is very meritorious.

The expedient of exhaust gas recirculation is effective for reducing nitrogen oxides in the exhaust gas. Also in the engine of this invention, when the exhaust gas is used for the scavenging and is fed until the initial stage of a suction stroke, it can be recirculated at high efficiency, and this is advantageous in requiring no new or additional device.

In an operation employing a low suction pressure and/or a thin mixture, the reliability of ignition is higher as the compression ratio of the engine is higher. This is based on the fact that, when an ignition spark is discharged, the mixture is more reliably ignited at a higher degree of compression. Also in this regard, the engine of the invention employing a higher compression ratio has been proved excellent. In an experiment with the foregoing experimental engine, when the compression ratio was 12.5, an operation at a power coefficient of ¼ and an air fuel ratio of 16.6 could be readily executed without especially reinforcing the ignitability. An output of 1.2 hp and a thermal efficiency of 17.5% at this time demonstrate that, with reference to an output of 1.25 hp and a thermal efficiency of 17.3% in the case where only the air fuel ratio was changed to 14.9, a favorable operation could be executed in spite of the higher air fuel ratio.

An operation employing the thinnest possible mixture is a very effective expedient for cleaning the exhaust gas. The engine of this invention can be operated with a thinner mixture than in the conventional engine, and this is also a beneficial result of the invention employing the high compression ratio.

What is claimed is:

1. In a method of operating a high-compression, four-cycle, spark ignition, reciprocating piston-type internal combustion engine to achieve improved thermal efficiency without knocking, the improvement which comprises the steps of: injecting pressurized exhaust gas which was previously discharged from the engine and which has been cooled to about ambient temperature into the cylinder between the piston and the cylinder head at a time close to the end of the exhaust stroke when the piston is at or close to its top dead center position and while the exhaust valve is still open to discharge from the cylinder hot residual gaseous products of combustion from the preceding combustion and to replace same by said cooled exhaust gas prior to the next suction stroke; and adjusting the ignition timing so that the following spark ignition point occurs at a time close to but shortly after the knocking limit ignition point of the fuel-gas mixture.

2. A method according to claim 1 wherein said engine has a compression ratio of from 10 to 15.

3. A method according to claim 2 in which the spark ignition point is about 3 to 4 degrees after the knocking limit ignition point.

4. A method according to claim 1, in which, as the engine power is decreased, the rate of flow of the pressurized exhaust gas injected into the cylinder is decreased and the ignition timing is advanced.

5. In a high-compression, four-cycle, spark ignition, reciprocating piston-type, internal combustion engine having a cylinder, a cylinder head forming a combustion chamber with said cylinder, a piston reciprocable in said cylinder, intake and exhaust ports in said head communicating with said cylinder and intake and exhaust valves for opening and closing said intake and exhaust ports, the improvement which comprises: said engine has a scavenging gas passageway in the cylinder head and said scavenging gas passageway has a scavenging gas inlet port at one end thereof communicating with the upper end of the cylinder; a poppet valve in said scavenging gas inlet port for opening and closing communication between said scavenging gas passageway and said cylinder; a gas flow regulator valve in said scavenging gas passageway; a scavenging gas pump having an outlet connected to the other end of said scavenging gas passageway, said scavenging gas pump having an inlet connected to receive cooled exhaust gas from the engine; and means for regulating the spark ignition point so that spark ignition occurs at a time close to but shortly after the knocking limit ignition point of the fuel-gas mixture used in the engine whereby to achieve improved thermal efficiency without knocking.

* * * * *